Sept. 27, 1960 R. R. BLAIR 2,954,485

TRANSISTOR BINARY COUNTERS WITH FAST CARRY

Filed Dec. 24, 1956

INVENTOR
R. R. BLAIR
BY [signature]
ATTORNEY

United States Patent Office 2,954,485 Patented Sept. 27, 1960

2,954,485

TRANSISTOR BINARY COUNTERS WITH FAST CARRY

Royer R. Blair, Berkeley Heights, N.J., assignor to Bell Telephone Laboratories, Incorporated, New York, N.Y., a corporation of New York Filed Dec. 24, 1956, Ser. No. 630,333

6 Claims. (Cl. 307—88.5)

This invention relates generally to controllable switching circuits. In the specific embodiments described below the invention is embodied, for illustrative purposes, in transistorized switching circuits for increasing the speed of operation and improving the overall performance of parallel-type binary counters. These embodiments employ preset shunt-type transistor switches which provide for the simultaneous change of state of any or all of the stages in a binary counter at any given time.

In the ordinary serial type of binary counter having a chain of series-connected bistable circuits, a train of pulses which are to be counted must pass successively from one bistable circuit to the next, i.e., the output of each bistable circuit must trigger the adjacent subsequent bistable circuit and so on down the chain, depending upon the progress of the count. When the active elements in these bistable circuits are junction transistors, there is a substantial cumulative delay in the transmission of pulses from one end of the series chain to the other. This delay is often intolerable and is a direct result of the relatively slow switching times of the transistors used.

The junction transistor makes a desirable switch except for its relatively slow switching action, i.e., the relatively long time required by its internal collector-emitter path to change from a high impedance state (switch open) to a low impedance state (switches closed). Suppose, for example, that the counting has reached the point where the application of one more trigger pulse to the input of the first bistable circuit in the series chain will cause all subsequent bistable circuits to change state, one by one or sequentially. The second bistable circuit cannot change state until the first bistable circuit has changed state, the third bistable circuit cannot change state until the second bistable circuit has changed state, and so on down the line until the last bistable circuit has finally changed state. As a result of this sequential operation, the delay in transmitting the trigger pulse from one end of the chain to the other may exceed the time interval between two trigger pulses. Consequently, in a situation where the delay time of a counter exceeds the time interval between two pulses, an accurate up-to-date count of the trigger pulses cannot be made unless the supply of input pulses is discontinued until all of the stages of the counter, which must change state to establish the count, have changed state.

The inherent cumulative delay in serial type binary counters is avoided in a parallel-type binary counter using the principle of fast carry. By this principle, transistor switches, controlling the deployment of pulses, are preset to be OFF (high impedance state of the internal collector-emitter path) or ON (low impedance state of the internal collector-emitter path).

The principle of fast carry is discussed in detail in a copending application of J. H. Felker, Serial No. 541,636, filed October 20, 1955, now Patent No. 2,885,572, granted May 5, 1959, and also in a copending application of J. J. Scanlon, Serial No. 541,637, filed October 20, 1955, now Patent No. 2,906,891, granted Sept. 29, 1959. A feature of each of the inventions disclosed in these copending applications is a series chain of preset junction transistor switches eliminating as nearly as possible the time delay involved in the transmission of carry pulses in a parallel binary adder. Thus, a cumulative time delay in the transmission of the carry pulses through the series chain of transistor switches is avoided by using control pulses, which are synchronized with the carry pulses, to preset the transistor switches through which the carry pulses must pass.

As used in a parallel-type binary counter, however, the use of the fast carry principle need not require a separate source of control pulses. Rather, in illustrative embodiments of the invention as described in detail below, the junction transistor switches are preset in accordance with the output states of the bistable devices of the counter.

In counters utilizing a long series-connected chain of switches operating on the fast carry principle, each switch in the chain must have a very low impedance when it is ON if the trigger pulses supplied to the counter stages are to have substantially uniform amplitude throughout the counter. Thus, the pulses supplied to the first stage and those supplied to the last stage can be substantially uniform only if the total resistance of the intervening series-connected switches is very low compared with the input impedance of a counter stage. Furthermore, in a long chain of series-connected switches, trigger currents through the switches associated with the least significant of the counter stages (the order of significance of the binary stages increasing with increasing remoteness from the source of trigger pulses) may be quite large. Junction transistors used in such a chain would have to meet stringent requirements. Thus, junction transistor switches employed in a counter having a large number of stages are preferably shunt-connected rather than connected in a long series chain, because current supplied from the pulse source may be substantially equally divided among the various shunt switches. As a result of this uniform division of the source current, the requirements of shunt transistor switches are more relaxed than would be those of series-type transistor switches supplied from the same source.

It is therefore an object of the present invention to increase the speed of operation of tandem associated loads. A related, and more specific object is to decrease the time required, following the application of a trigger pulse, for the various stages of a binary counter or the like to achieve their new states.

Another particular object is to improve the uniformity in amplitude of the pulses supplied to the various stages of a counter.

A related object of the present invention is to relax the requirements of transistors to be used in the circuits of a transistorized counter.

Of course, if the state of equilibrium of the *n*th stage requires no reversal, all stages subsequent to that stage must also remain unchanged. This is achieved in accordance with the invention by interconnecting the shunt-switches with diodes. The diodes are so connected and biased as to close all shunt-switches subsequent to the *n*th stage, when the shunt-switch of the *n*th stage is closed, and thereby disable the inputs of all stages subsequent to the *n*th stage.

Diodes, or other unilaterally conducting devices, are employed so that, although succeeding stages are disabled, preceding stages are unaffected by the interconnecting circuits.

For a more detailed description of the transistor switches employed in the illustrative embodiments, reference may be made to a copending application of P. A. Reiling, Serial No. 410,924, filed February 17, 1954, now Patent No. 2,922,151. However, to understand the present invention it is necessary only to know that the collector-emitter path of a transistor having the properties of junction transisters may be switched, by the application of appropriate potentials to the base electrode, from a cut-off or high impedance state (e.g., megohms) to a saturation or low impedance state (as low as a few ohms).

In the realization of the above objects, one embodiment of the invention, described in detail below comprises an up or down binary counter (often referred to as a reversible binary counter) having a plurality of parallel-connected stages and a fast carry circuit comprising shunt-connected transistor switches for controllably routing trigger pulses simultaneously to each stage whose state of equilibrium requires a reversal.

Each of these switches is preset in response to the state of equilibrium of a preceding stage to avoid the deday which would otherwise result from the relatively slow switching speeds of junction type transistors.

For example, if the count is such as to require the *n*th stage of the counter to reverse state upon the application of the next trigger pulse, the shunt switch associated with the *n*th stage is preset to be in its normally open condition so that the input terminal of that stage is enabled (rendered operative).

If, on the other hand, the state of the *n*th stage is to remain unchanged, the shunt switch associated with that stage is closed in response to the state of a previous stage. This effectively disables (renders inoperative) the input terminal of the *n*th stage since the next trigger pulse, instead of changing the state of the *n*th stage, is diverted through the associated switch to ground. Throughout the specification and the appended claims, the term "enabled" should be interpreted as meaning "rendered operative," while the term "disabled" should be taken to means "rendered inoperative."

A more complete understanding of the present invention as well as further objects and features, will better be understood from the following description when read in connection with the accompanying drawings, in which.

Figure 1:
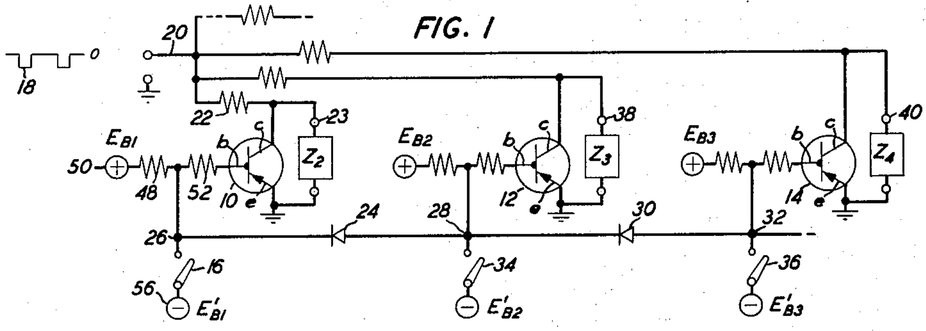
Fig. 1 illustrates the shunt-connected switching arrangement utilized in the illustrative embodiments of the present invention.
Figure 2:
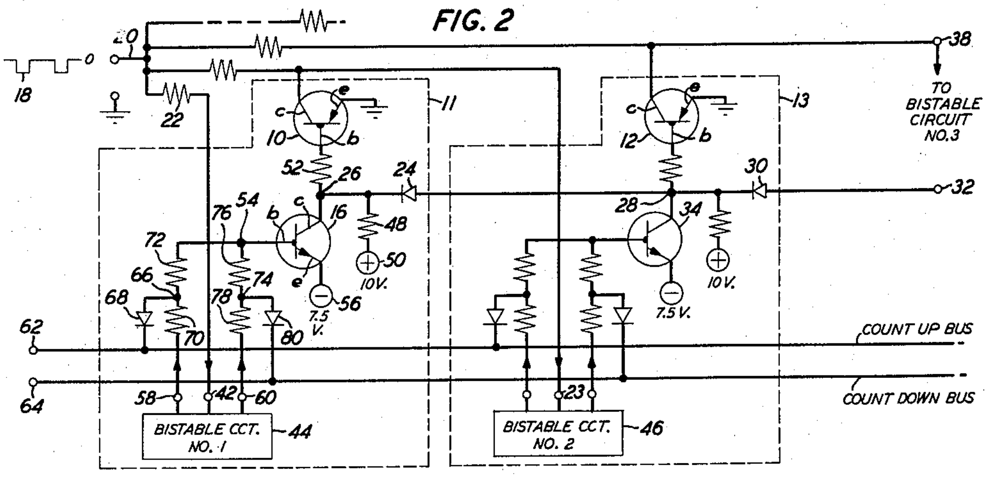
Fig. 2 is a circuit diagram of a parallel type binary counter embodying the present invention.
Figure 3:
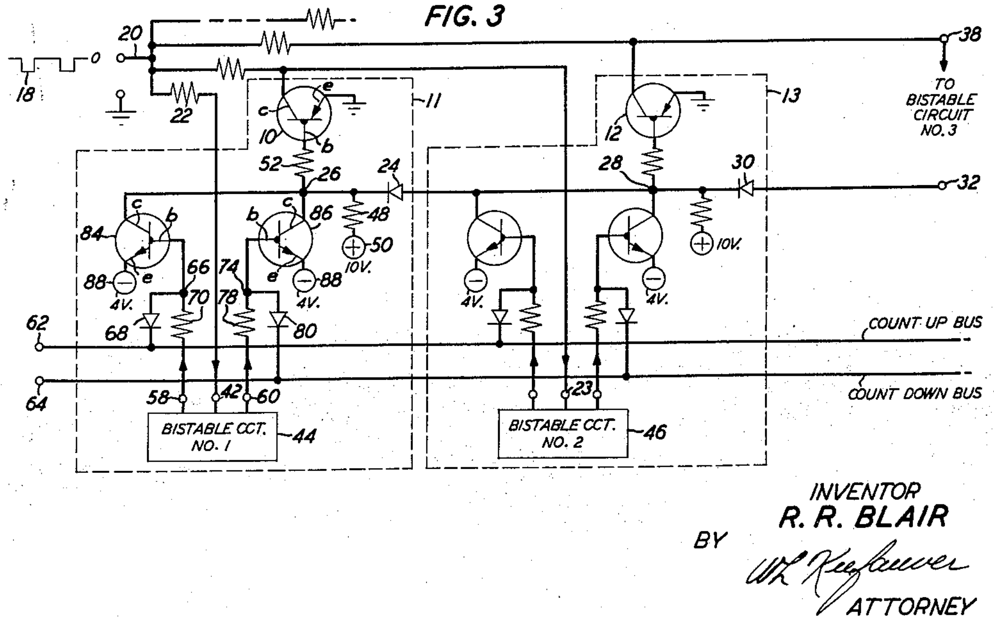
Fig. 3 is a modification of the circuit illustrated in Fig. 2, also embodying the present invention.

Referring now to the accompanying drawings wherein like elements are designated by like reference characters in all of the figures, and referring particularly to Fig. 1, a three stage shunt-connected switching circuit is shown which is equivalent to those utilized in the illustrative embodiments of Figs. 2 and 3.

Switches 10, 12, and 14 are junction transistors, each having a collector electrode *c*, a base electrode *b*, and an emitter electrode *e*. Each of the switches is ON (switch closed) when the bias potential between its emitter electrode *e* and its base electrode *b* is in the forward direction, i.e., when the bias potential is such as to cause current in flow in the direction of the emitter arrow.

In the absence of potential $E'_{B1}$, potential $E_{B1}$ biases the emitter-base path of transistor 10 in the reverse direction. However, when switch 16 is closed the emitter-base path of switching transistor 10 is biased in a forward direction, and switching transistor 10 is ON. Transistors 12 and 14 are biased in a similar fashion.

Thus, shunt switch 10 operates in response to switch 16. When switch 16 is closed, shunt switch 10 is ON.

When this switching circuit is used in a binary counter, switch 10, being in the first counter stage, controls the supply of trigger pulses to the bistable circuit in the second counter stage. Accordingly, the load impedance $Z_2$, which is shunted by the internal collector-emitter path of transistor 10, represents the input impedance of the bistable circuit in the second stage of a counter. Similarly, impedances $Z_3$ and $Z_4$ represent the input impedances of the bistable circuits in the third and fourth counter stages, respectively.

When shunt switch 10 is ON, negative trigger pulses 18 which are supplied to a common input conductor 20 pass through a resistor 22, through the internal collector-emitter path of shunt switch 10, and thence to ground.

It is assumed here that the impedance of the internal collector-emitter path of transistor 10 is very much less than impedance $Z_2$ when transistor 10 is ON and is very much greater than $Z_2$ when transistor 10 is OFF. This is true in the illustrative embodiments of Figs. 2 and 3, wherein the input impedance of the bistable circuit of the second counter stage, as hereinbefore mentioned, is equivalent to the impedance $Z_2$ of Fig. 1. Thus, when shunt switch 10 is ON, terminal 23 of impedance $Z_2$ is disabled and trigger pulses are diverted through switching transistor 10 to ground. When, however, shunt switch 10 is OFF, terminal 23 of impedance $Z_2$ is enabled and trigger pulses are supplied to impedance $Z_2$.

In the counters to be described below, it is necessary that all loads subsequent to a closed switch (16, 34, or 36), be disabled. To this end, and, in further accordance with principles of the invention, the various shunt transistor switches are interconnected by diodes 24, 30, etc. These diodes are poled as shown and biased by the sources $E_{B1}$, $E'_{B1}$, $E_{B2}$, $E'_{B2}$, etc., depending on the open or closed condition of the switches 16, 34, and 36.

Assume, for example, that switch 16 is closed and that switches 34 and 36 are open. Diode 24 will be forward-biased since the net effect of sources $E_{B1}$ and $E'_{B1}$ leaves juncture 26 less positive than juncture 28. Similarly, juncture 28 will be at a potential less positive than that of juncture 32, so that diode 30 will also be forward-biased. Source $E'_{B1}$ therefore biases transistors 12 and 14 to their ON condition which in turn disables loads $Z_3$ and $Z_4$ insofar as receiving pulses from conductor 20 is concerned.

Or, for example, assume that switch 34 is closed and that switches 16 and 36 are open. Diode 24 will be reverse-biased since juncture 26, at potential $E_{B1}$, will be more positive than juncture 28; transistor 10 will, therefore, be held in its OFF condition by source $E_{B1}$ and load $Z_2$ will be enabled to receive pulses from conductor 20. As in the first assumed case, however, diode 30 will be forward-biased, transistors 12 and 14 will be ON, and loads $Z_3$ and $Z_4$ disabled.

The potential drops through successive conducting diodes such as 24 and 30 will be cumulative and it may be necessary to shunt a group or groups of diodes with an additional similarly poled diode to insure the conduction of all transistors beyond a closed switch.

Referring now to Fig. 2 and recalling that like elements are designated by like reference characters in all of the figures, only two stages of a multistage counter are shown for the sake of simplicity and clarity of description, and to avoid unnecessary repetition. They are a first counter stage 11 and a second counter stage 13. However, it should be understood that one of the advantages of the present invention is that it allows the number of stages in a transistorized counter to be greatly increased without hampering performance, and that, by no means, is the invention to be construed as being restricted to a two-stage counter. Furthermore, it should be understood that the invention and its application are not restricted to binary counters or to counters generally.

In the illustrated example, a train of negative trigger pulses 18 is supplied to a common input conductor 20 to which is connected a plurality of input circuits, one for each bistable circuit of the counter. In the first stage, padding resistor 22 is connected between the common input conductor 20 and the input terminal 42 of bistable circuit 44. Of course, each bistable circuit has two stable states of equilibrium. Note that the first bistable circuit 44 of the counter does not have a switch connected to its input terminal 42, as do the other bistable circuits of the counter. Consequently, the input terminal 42 of bistable circuit 44 is always enabled, and bistable circuit 44 will change state with each trigger pulse supplied to the common input conductor 20.

The first counter stage 11 includes a junction transistor switch 10 enabling or disabling the input terminal 23 of bistable circuit 46 of the second counter stage 13. Shunt-type transistor switch 10 is operative in response to the state of equilibrium of bistable circuit 44 as will be shown below.

Shunt-type transistor switch 10, is ON (closed) when the bias potential between its emitter electrode *e* and its base electrode *b* is in a forward direction. The bias circuit of shunt-type transistor switch 10 includes a resistor 48 connected between juncture 26 and an appropriate source of positive direct potential 50, a resistor 52 connected between juncture 26 and the base electrode *b* of shunt-type transistor switch 10, and a transistor switch 16. Transistor switch 16 has a base electrode *b* connected to a juncture 54, a collector electrode *c* connected to juncture 26 and an emitter electrode *e* connected to an appropriate source of negative direct potential 56. Thus, when the potential of juncture 54 becomes more positive than that of source 56, switch 16 is closed and as a consequence shunt-type switch 10 is closed. Transistor switch 16 of Fig. 2, in fact, corresponds to switch 16 in Fig. 1, while the source of positive direct potential 50 and the source of negative direct potential 56 in Fig. 2 correspond to sources $E_{B1}$ and $E'_{B1}$, respectively, in Fig. 1.

Although shunt-type switch 10 operates in response to the state of equilibrium of bistable circuit 44, it does so indirectly. Actually, switch 10 operates in response to switch 16, which in turn operates directly in response to the state of equilibrium of bistable circuit 44.

The counter shown is, in fact reversible; i.e., it can count either "up" or "down." The sense of the counting, i.e., "up" or "down" is controlled by the application of appropriate clamping potentials, by means not shown, to the "count up bus" or "count down bus." For example, to count up, the count up bus is clamped to, say, −10 volts and the count down bus to +10 volts; for counting down, these potentials are reversed. The values of these clamping potentials are selected relative to the potentials of the output terminals of the bistable circuits (e.g., 58 and 60) which, in the illustrative example, alternate between −8 volts and −2 volts.

The clamping potentials just mentioned control the conduction of diodes 68 and 80 and similar diodes in other stages and hence determine which of the output terminals of the bistable circuits (e.g. 58 or 60) shall control the operation of its associated transistor switch (e.g., transistor 16). Note, for example, that with a potential of −10 volts on the count up bus and +10 volts on the count down bus, diode 68 will be forward biased regardless of the state of the bistable circuit. Under this condition, juncture 74 and hence juncture 54 will be free to follow the potential excursion of output terminal 60 while juncture 66 will be clamped at −10 volts, thus effectively disabling output terminal 58 insofar as its effect on switch 16 is concerned.

With sources 56 and 50 of −7.5 volts and +10 volts, respectively, transistor switch 16 will be ON when the potential of juncture 54 exceeds in a positive sense −7.5 volts. When switch 16 is OFF juncture 26 is at +10 volts and transistor switch 10 is OFF, thus having no effect on the application of pulses to input terminal 23 of bistable circuit 46. When switch 16 is closed, however, juncture 26 is clamped at substantially −7.5 volts which turns transistor switch 10 ON and effectively disables input terminal 23 of bistable circuit 46.

As mentioned above, transistor switch 16 will be ON when the potential of juncture 56 exceeds in a positive sense −7.5 volts. With bistable circuit 44 in one state, terminal 60 is at −2 volts and terminal 58 at −8 volts. Assuming the count up bus and count down bus to be at −10 volts and +10 volts, respectively, and assuming also equal-valued resistors 72, 76, and 78 (although this is not necessary and, in some cases, it may be desirable to have them unequal in value), the potential of juncture 54 will be approximately −7⅓ volts, or, more positive than −7.5 volts. Therefore, in the first assumed state of equilibrium of bistable circuit 44, switch 16 is closed, shunt switch 10 is closed, and input terminal 23 of bistable circuit 46 is disabled. In the other state of equilibrium of bistable circuit 44, juncture 54 will be at approximately −9⅓ volts, switch 16 will be open and input terminal 23 of bistable circuit 46 will be enabled.

Each of the remaining stages of the counter, with the exception of the last (the last stage is not shown in Figs. 2 and 3) which has no switching system, includes the same elements as the first counter stage 11. Each switch opens and closes at a rate dependent upon the order of significance of its counter stage. Thus, switch 10 opens or closes with every $2^0$ (the zero power of two) pulse or, in other words, with every trigger pulse supplied to common input conductor 20. Switch 12 opens or closes with every $2^1$ (the first power of two) pulse or, putting it another way, with every other trigger pulse supplied to common input conductor 20; and so on down the stages of the counter. In general, the *n*th stage of a counter having S stages would have a shunt-type switch opening or closing with every $2^{(n-1)}$ trigger pulse supplied to common input conductor 20, where $n=1, 2, 3 \ldots (S-2), (S-1)$. Thus, the fifth stage of a counter ($n=5$) having six stages would have a shunt-type switch opening or closing with every $2^4$ or sixteenth trigger pulse supplied to common input conductor 20.

As in Fig. 1, a diode 24 is connected between junctures 26 and 28 of Figs. 2 and 3, and poled in the same direction. Although only two stages of the counters of Figs. 2 and 3 are shown, diode 30 is seen to be connected between juncture 28 of the second counter stage 13 and juncture 32 of a third counter stage not shown.

Turning now to Fig. 3, it will be noted that the circuits of Figs. 2 and 3 are substantially the same except for the networks connecting the shunt-type transistor switches 10 and 12 to their respective bistable circuits. This difference will be understood from a comparison between counter stage 11 of Fig. 2 and counter stage 11 of Fig. 3. The same difference exists between counter stage 13 of Fig. 2 and counter stage 13 of Fig. 3. In the illustrative embodiment of Fig. 3, and particularly in counter stage 11, transistors 84 and 86 replace transistor 16 and resistors 72 and 76 of the same stage in Fig. 2.

By way of example, again, assume that it is desired to count up. Count up bus 62 is again clamped to −10 volts, and count down bus 64 is clamped to +10 volts. Again assume that in one of two stable states of equilibrium of bistable circuit 44 output terminals 58 and 60 are at potentials of −8 and −2 volts, respectively, these potentials being interchanged when bistable circuit 44 is in its other state of equilibrium. The emitters *e* of transistors 84 and 86 are connected to an appropriate source of negative direct potential 88 of, say, −4 volts.

When counting up, the potential of output terminal 58 is always more positive than that of count up bus 62, no matter what the state of equilibrium of bistable circuit 44, and therefore the potential of juncture 66 is always approximately −10 volts. Since, when counting up, the potential of juncture 66 is always more negative than that of source 88 which provides a potential of −4 volts, the bias potential between the base electrode *b* and the emitter electrode *e* of transistor 84 is always in the reverse direction and therefore transistor 84 is always OFF. Similarly, when counting down, it is transistor 86 which is always OFF. When counting up, however, transistor 86 is ON when output terminal 60 is at a potential of −2 volts. This is because the base-emitter path of transistor 86 is forward-biased as a result of the potential of output terminal 60 (−2 volts) being more positive than the potential provided by source 88 (−4 volts). It follows that transistor 86 is OFF when output terminal 60 is at a potential of −8 volts, since this potential is less positive than that provided by source 88 (−4 volts) and the base-emitter path of transistor 86 is therefore reverse-biased.

Thus, when bistable circuit 44 is in one state of equilibrium, transistor 86 is on, shunt-type transistor switch 10 is on, and input terminal 23 of bistable circuit 46 is disabled. When, however, bistable circuit 44 is in its other state of equilibirum, transistor 86 is off, shunt-type transistor switch 10 is off, and input terminal 23 of bistable circuit 46 is enabled.

The illustrative embodiment of Fig. 3 is an improvement over that of Fig. 2 in that more efficient use is made of the bistable circuit outputs.

It should be noted that the use of negative trigger pulses in the illustrative embodiments shown is a matter dependent on the makeup of the bistable circuits used in the counter. The use of negative trigger pulses requires that the transistors in the drawings be of the type shown. If it were necessary or desirable to use positive trigger pulses, each of the transistors depicted would be replaced by one of the opposite conductivity type. For example, transistor 10 which is of the P–N–P junction type, would be replaced by a transistor of the N–P–N junction type.

It is thus seen that pulses of uniform amplitude can be routed simultaneously, at any given time and with substantially no cumulative time delay, to any number of or all of the stages of a counter employing shunt-type transistor switches.

From the foregoing it is further seen that features of the present invention include new and useful means for the rapid transmission of pulses of direct current, particularly when such means are used in a counter having a large number of stages.

It should be understood that although for purposes of describing the present invention, specific transistor types, unidirectional current devices, and circuit arrangements have been illustrated and discussed, the invention is in no way to be limited to these specific elements and circuit arrangements. Numerous other arrangements may be devised by those skilled in the art without departing from the spirit and scope of the invention.

What is claimed is:

1. A parallel-type binary counter comprising a plurality of bistable stages each having an input terminal and at least one output terminal, a source of pulses to be counted, unilaterally conductive means interconnecting said stages to permit counting in the binary mode, individual input circuits for each of said stages for connecting each of said input terminals to said source, individual means associated with each of said stages except the first for controllably routing pulses from said source to the input terminal of each of said stages whose bistable state is to be reversed, said last-mentioned means comprising a junction-type transistor having a base electrode and a pair of further electrodes, means connecting the pair of further electrodes of said transistor in shunt between the input circuit of said transistor's associated stage and a point of reference potential, and means for controlling the potential of the base electrode of each of said transistors in response to the potential of an output terminal of the stage immediately preceding the stage with which said transistor is associated, said last-named means comprising two additional junction-type transistors each associated with one of the output terminals of said immediately preceding stage and each also having a base electrode and a pair of further electrodes, means for connecting said base electrode of each of said additional transistors to its associated output terminal, means connecting one of said further electrodes of each of said additional transistors to the base electrode of said first-named transistor, and means for connecting the other of said further electrodes to a source of potential of magnitude and polarity sufficient to drive said first-named transistor to saturation when either of said additional transistors is in a saturated state.

2. The combination in accordance with claim 1 and means for biasing one of said additional transistors in a saturated condition when said immediately preceding stage is in one of its two states of equilibrium and in a cutoff condition when said immediately preceding stage is in its other state of equilibrium.

3. A parallel-type binary counter comprising a plurality of bistable stages each having an input terminal and at least one output terminal, a source of pulses to be counted, individual input circuits for each of said stages connecting each of said input terminals to said source, individual means associated with each of said stages except the first for controllably routing pulses from said source to the input terminal of each of said stages whose bistable state is to be reversed, each of said last-mentioned means comprising a junction-type transistor having a base electrode and a pair of further electrodes, said pair of further electrodes interconnecting a point of reference potential and the input terminal of the stage with which said transistor is associated, and control means including unilaterally conductive means for interconnecting said base electrode and the output terminal of each stage preceding the stage with which said transistor is associated and for controlling the potential of the base electrode of said transistor, said last-named means permitting counting in the binary mode, said control means comprising at least one additional junction-type transistor also having a base electrode and a pair of further electrodes, means connecting said last-named base electrode to the output terminal of a preceding stage, said additional transistor being in a saturated condition when said preceding stage is in one of its two states of equilibrium and in a cutoff condition when said preceding stage is in its other state of equilibrium, means connecting one of said last-named further electrodes to a source of potential of magnitude and polarity sufficient to drive said each of said first-named transistors to saturation when said additional transistor is in a saturated condition, and means connecting the other of said further electrodes of said additional transistor to the base electrode of the first-named transistor, said last-mentioned means comprising at least one unilaterally conducting device poled in the direction permitting said source of potential to drive said controlling first-named transistor to saturation when said additional transistor is in its saturated state.

4. A binary counter comprising a plurality of bistable stages, each having two stable states of equilibrium, a trigger input and at least one output; an input common to all of said stages; a source of trigger pulses connected to said common input; a plurality of conductive paths each extending from said common input to the trigger input of an associated one of said stages and each being of uniform impedance; a plurality of transistor switches each comprising base, emitter and collector electrodes and each being associated with the trigger input of one of said stages except the first; means connecting each said collector electrode to said associated stage trigger input, means connecting each said emitter electrode to a point of reference potential, and control means connecting each said base electrode to said output of each stage preceding the stage with which said each transistor switch is associated, said control means including a plurality of unilaterally conductive devices interconnecting each said base electrode to permit counting in the binary mode; said control means further including means to render said each transistor switch conductive when any of said preceding stages is in a particular one of its two states of equilibrium, to divert said trigger pulses through the collector-emitter path of said each transistor switch to said point of reference potential, and nonconductive when each of said preceding stages is in its other state of equilibrium, to permit conveyance of said pulses through said associated stage trigger input.

5. A binary counter in accordance with claim 4 wherein said last-named means to render said each transistor switch conductive comprise means to apply a bias potential to the base electrode of said each transistor switch, said bias potential forward-biasing said each transistor switch when said any preceding stage is in said particular state of equilibrium and reverse-biasing said each transistor switch when each of said preceding stages is in said other state of equilibrium.

6. A binary counter which comprises a plurality of stages each comprising a binary register having an input terminal, at least one output terminal, and two stable states of equilibrium; an input conductor common to all of said stages; means for supplying pulses to said common input conductor; each of said stages further comprising a conductive path, extending from said common input conductor to the input terminal of its binary register, for conveying said pulses through said register, the conductive paths of all of said stages being of uniform impedance; each of said stages except the last also including a transistor switch having base, emitter and collector electrodes; control means interconnecting said output terminal of the binary register of each stage with said base electrode of its associated transistor switch to render said transistor switch conductive when said register is in a particular one of its states of equilibrium; means connecting said collector electrode to the input terminal of the register of the next succeeding stage, and said emitter electrode to a point of reference potential, for diverting pulses intended for said next succeeding register through the collector-emitter path of said transistor switch to said point of reference potential when said transistor switch is rendered conductive; and a series chain of unilaterally conductive devices interconnecting each of the base electrodes of said transistor switches and poled to permit the counting of said pulses in the binary mode.

References Cited in the file of this patent

UNITED STATES PATENTS

| | | |
|---|---|---|
| 2,535,377 | Titterton | Dec. 26, 1950 |
| 2,594,449 | Kircher | Apr. 29, 1952 |
| 2,601,096 | Creamer | June 17, 1952 |
| 2,663,800 | Herzog | Dec. 22, 1953 |
| 2,764,343 | Diener | Sept. 25, 1956 |
| 2,774,868 | Havens | Dec. 18, 1956 |

FOREIGN PATENTS

| | | |
|---|---|---|
| 1,119,709 | France | Apr. 9, 1956 |